United States Patent
Collins

(10) Patent No.: US 9,382,704 B2
(45) Date of Patent: *Jul. 5, 2016

(54) PROTECTIVE AIR BARRIER SEALANT FOR CONDITIONED AND UNCONDITIONED BUILDING WALLS

(71) Applicant: SealantTech, Las Vegas, NV (US)

(72) Inventor: William Davis Collins, Fayetteville, AR (US)

(73) Assignee: SealantTech

( * ) Notice: Subject to any disclaimer, the term of this patent is extended or adjusted under 35 U.S.C. 154(b) by 0 days.

This patent is subject to a terminal disclaimer.

(21) Appl. No.: 14/741,746

(22) Filed: Jun. 17, 2015

(65) Prior Publication Data

US 2015/0284943 A1   Oct. 8, 2015

Related U.S. Application Data

(63) Continuation-in-part of application No. 12/785,900, filed on May 24, 2010, now Pat. No. 9,068,088, which is a continuation-in-part of application No. 12/569,937, filed on Sep. 30, 2009, now abandoned.

(51) Int. Cl.

| | |
|---|---|
| *C08J 9/00* | (2006.01) |
| *E04B 1/76* | (2006.01) |
| *C09K 3/10* | (2006.01) |
| *E04F 13/02* | (2006.01) |
| *E04B 1/94* | (2006.01) |
| *C09D 5/14* | (2006.01) |
| *C09D 5/18* | (2006.01) |
| *C09D 7/12* | (2006.01) |
| *C08L 75/04* | (2006.01) |
| *C08K 3/00* | (2006.01) |
| *C08K 3/04* | (2006.01) |
| *C08K 3/08* | (2006.01) |
| *C08K 5/00* | (2006.01) |
| *C08G 101/00* | (2006.01) |

(52) U.S. Cl.
CPC .............. *E04B 1/76* (2013.01); *C08J 9/0004* (2013.01); *C08J 9/008* (2013.01); *C08J 9/0014* (2013.01); *C08J 9/0028* (2013.01); *C08L 75/04* (2013.01); *C09D 5/14* (2013.01); *C09D 5/18* (2013.01); *C09D 7/1241* (2013.01); *C09K 3/1021* (2013.01); *E04B 1/948* (2013.01); *E04F 13/02* (2013.01); *C08G 2101/0025* (2013.01); *C08G 2150/60* (2013.01); *C08G 2190/00* (2013.01); *C08J 2205/052* (2013.01); *C08J 2205/10* (2013.01); *C08J 2207/00* (2013.01); *C08J 2207/04* (2013.01); *C08J 2375/04* (2013.01); *C08K 3/005* (2013.01); *C08K 3/0025* (2013.01); *C08K 3/04* (2013.01); *C08K 3/08* (2013.01); *C08K 5/0066* (2013.01); *C09K 2003/1078* (2013.01); *Y10T 428/23* (2015.01); *Y10T 428/249977* (2015.04)

(58) Field of Classification Search
CPC ................... C08G 2150/60; C08G 2101/0025; C09D 175/04; C08J 9/0028; C08J 9/0014; C08J 9/008; C08J 2205/10; C08J 2207/00; C08J 2207/04; C08J 2375/04

See application file for complete search history.

(56) References Cited

U.S. PATENT DOCUMENTS

| | | |
|---|---|---|
| 4,318,959 A | 3/1982 | Evans et al. |
| 4,596,725 A | 6/1986 | Kluth et al. |
| 4,795,760 A | 1/1989 | Lucke |
| 4,939,184 A | 7/1990 | Kennedy |
| 5,549,869 A | 8/1996 | Iwakawa |
| 5,583,230 A | 12/1996 | Mitamura et al. |
| 5,804,641 A | 9/1998 | Iwakawa |
| 5,900,195 A | 5/1999 | Pool et al. |
| 6,402,201 B1 | 6/2002 | Pool et al. |
| 6,887,966 B2 | 5/2005 | Nomura et al. |
| 7,459,167 B1 | 12/2008 | Sengupta et al. |
| 9,068,088 B2 * | 6/2015 | Collins .................. C09D 5/14 |
| 2003/0207122 A1 | 11/2003 | Uchida et al. |
| 2004/0077747 A1 | 4/2004 | Payne |
| 2004/0162359 A1 * | 8/2004 | Barber ................ C08G 18/225 521/159 |

\* cited by examiner

*Primary Examiner* — John Cooney
(74) *Attorney, Agent, or Firm* — Triangle Patents, PLLC

(57) ABSTRACT

A protective air barrier air barrier sealant and methods of applying the same, including a high density polyurethane chemistry provided in an amount, volume, and density effective for providing a protective air barrier for an enclosure, wherein the polyurethane material is combined with at least one UV, fire and antimicrobial protectant for providing UV protection to UV-exposed surfaces.

21 Claims, 1 Drawing Sheet

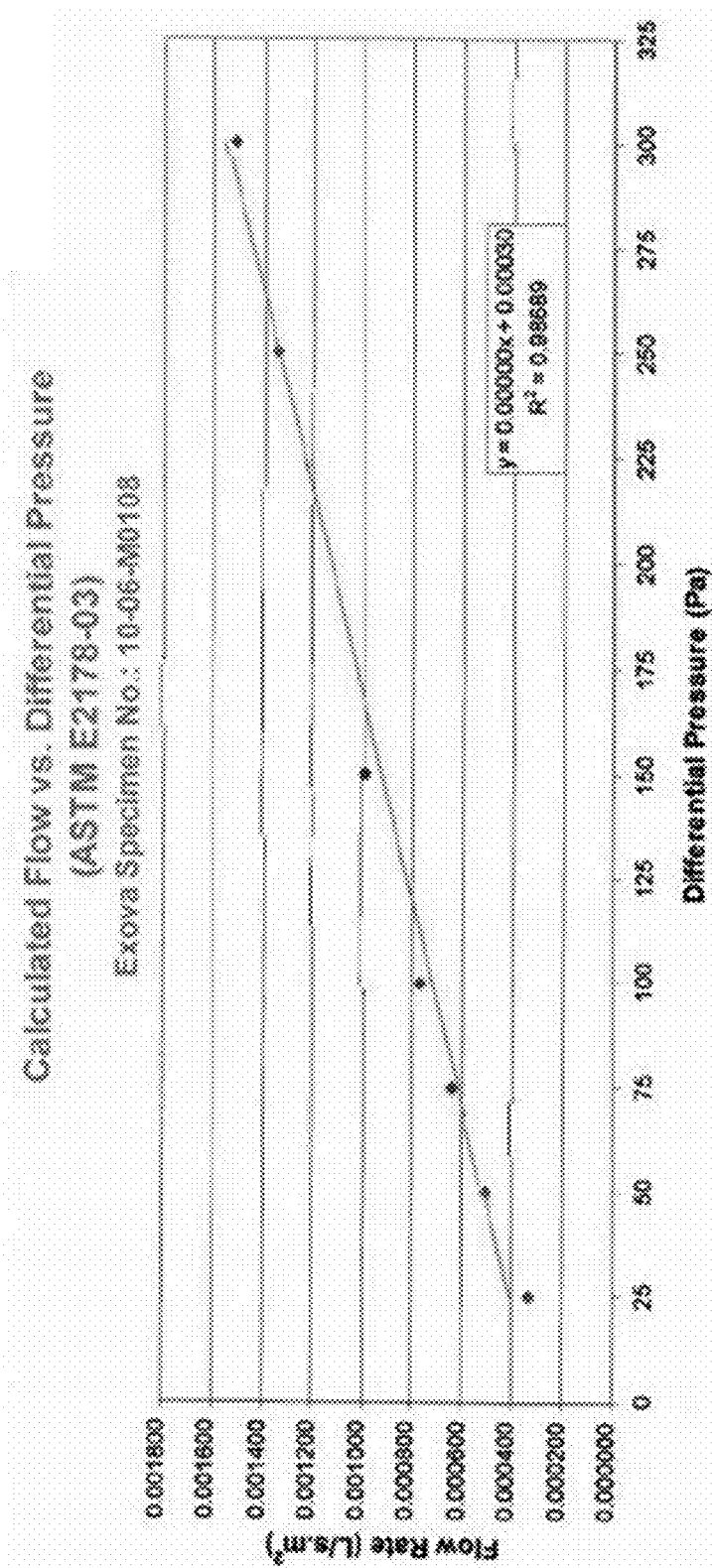

PROTECTIVE AIR BARRIER SEALANT FOR CONDITIONED AND UNCONDITIONED BUILDING WALLS

CROSS-REFERENCE TO RELATED APPLICATIONS

This application is a continuation-in-part of U.S. patent application Ser. No. 12/785,900, filed May 24, 2010, which is now U.S. Pat. No. 9,068,088, which is a continuation-in-part of U.S. patent application Ser. No. 12/569,937, filed Sep. 30, 2009, which is now abandoned, both of which are expressly incorporated herein by reference in their entirety.

BACKGROUND OF THE INVENTION

1. Field of the Invention

The present invention relates to air barrier products. Furthermore, the present invention relates to air barrier products with ultraviolet, insulation, fire and antimicrobial protection for application to building enclosures, walls, and to systems and methods relating thereto.

2. Description of the Prior Art

It is generally known in the art to provide for air barrier systems to buildings to control the unintended movement of air into and out of building enclosures. Air barrier systems essentially wrap the building shell and protect the building from the effects of air leakage. Air leakage can have detrimental effects on how a building functions and reduces the life span of a building.

Buildings are air-conditioned for comfort at considerable expense. When this conditioned air leaks out of a building and unconditioned air leaks into a building additional energy must then be used to condition this air. Air leakage can result in an increased use of up to 30-40% in heating costs and 10-15% in cooling costs.

Buildings which have properly installed air barrier systems can operate properly with a smaller HVAC system that does not have to compensate for a leaky building. In some cases, the reduction in mechanical equipment size and cost can offset the cost of the air barrier system.

Air barrier systems also provide a barrier to pollutants entering either the building or the building enclosure. Water vapor, suspended particulates, dust, insects, smells, etc are all pollutants which building occupants prefer to keep out of either the building. Water vapor that leaks into the building enclosure can condensate and form liquid water, a key component to corrosion and the development of mold.

Relevant prior art references include U.S. Pat. Nos. 4,318,959; 4,596,725; 4,795,760; 4,939,184; 5,549,869; 5,583,230; 5,804,641; 5,900,195; 6,402,201; 6,887,966; 7,459,167; and US Patent Application Publication Nos. 20040077747; 20030207122.

Polyurethane foam is known in the prior art as an air barrier material. Like a number of plastics, polyurethane foam loses resistance when exposed to UV light over a long period of time. With even short-term exposure, the surface of the foam changes, specifically the top molecular layer is damaged. The surface then becomes brown and brittle to a depth of one or two mm. For this reason, a layer of UV protection, most often UV paint, is applied to polyurethane foam on exteriors. If the polyurethane foam is applied to a roof it is necessary to use a high-quality UV protection layer with a long life. In some cases, these paints can also assume other functions such as water insulation or scratch protection. UV protection layers that are not integrated with the polyurethane require maintenance because the layer becomes damaged and/or weathered.

SUMMARY OF THE INVENTION

The present invention relates to air barriers for building envelopes in both conditioned and unconditioned living areas with ultraviolet, insulation, fire and antimicrobial protection.

It is an object of this invention to provide an air barrier sealant using polyurethane chemistry and an integrated ultraviolet protection element provided in an amount, volume, and density effective for providing a protective air barrier with UV-resistance for enclosures with UV-exposed surfaces. The invention also provides insulation (R-value) to the wall along with ingredients that will make the sealant fire proof.

It is a further object of this invention to provide a protective air barrier sealant to protect enclosures from microbes, mold, mildew, allergens, pollutants, gas deterioration, moisture deterioration, insect infestation through the use of it antimicrobial technologies which are incorporated into the material.

Yet another object of this invention is to provide methods for applying to surfaces the product that provides air barrier protection, UV protection and insulation (R-Value) and fire proofing.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 1 is a graph showing data associated with test results of the air barrier sealant product according to one embodiment of the present invention.

DETAILED DESCRIPTION

Referring now to the drawings in general, the illustrations are for the purpose of describing a preferred embodiment of the invention and are not intended to limit the invention thereto.

The present invention provides a protective air barrier sealant including a high density polyurethane foam material provided in an amount, volume, and density effective for providing a protective air barrier for an enclosure, wherein the air barrier material is combined with at least one UV, fire and antimicrobial protectant agent just prior to or at the time of application of the air barrier product to an enclosure surface. The air barrier sealant also provides a protective air barrier for surfaces from microbes, mold, mildew, gas deterioration, moisture deterioration, insects and damage from corrosion and combinations thereof, and insulating (R-Value) properties for the enclosure. Furthermore, the present invention provides methods for applying to surfaces the protective air barrier product that provides air barrier protection and insulative (R-Value) properties.

It is a further object of this invention to provide a protective air barrier sealant to protect enclosures from microbes, mold, mildew, allergens, pollutants, gas deterioration, moisture deterioration, insect infestation through the use of its antimicrobial technology which is incorporated into the sealant. Thus, an embodiment of the present invention includes at least one antimicrobial ingredient added to this air barrier sealant.

None of the prior art references provide for an air barrier sealant which includes an integrated UV-protection agent wherein the barrier has at least one exposed surface.

Thus there remains a need for an air barrier sealant for controlling the unintended movement of air into and out of a building enclosure and offering integrated UV protection to exposed surfaces.

The protective air barrier, insulative, UV-protectant, fire proof and antimicrobial sealant of the present invention is importantly established with an exposed polyurethane foam containing an integrated UV protectant on a UV-exposed surface area of an enclosure, and methods of applying the same to hard surfaces for providing an air barrier effective against damage from moisture, air and vapor, and deterioration by ultraviolet light, microorganisms, fungi, pests, and insects, as well as providing a physical air barrier to resist damage and/or wear and stop air leakage into or out of the building enclosure.

The present invention provides an air barrier sealant for protecting surfaces including a material having a top exposed surface that is spaced apart from a bottom surface wherein the spaced apart distance provides for an insulative thickness of the foam material, forming a coating on at least one enclosure surface. The product further includes at least one ultraviolet protectant capable of preventing ultraviolet degradation of the product. Preferably, the air barrier sealant is a dual component formulation, wherein the air barrier components are combined or mixed prior to or at the time of application of the air barrier to the enclosure surface.

The ultraviolet protectant is added to the polyurethane chemistry at the time of its manufacturing and is a raw ingredient of the finished formula. It is designed to stay in suspension in the liquid until it is sprayed at the job site. The ingredient is of a design and formulation that it allows it to stay in suspension until sprayed, thus giving a uniform ultraviolet protection throughout the finished product.

The UV protectant is selected from the group consisting of applications that allow the applicator to spray one application which will provide the UV protection without having to take the time and money to spray a second application. This one step application also provides for a very fast project which allows for the applicator to do the work in a timely manner and not hold up additional projects which may be scheduled for work after the air barrier sealant is applied.

Furthermore, preferably, a colorant is used as our UV protectant in the air barrier sealant according to the present invention. In a preferred embodiment, the UV protectant colorizes the air barrier product black and it is the black color that will absorb the UV rays which come in contact with the sealant. For example, carbon black can be used to colorize black and provide UV protection. If the UV rays are absorbed by the sealant material, then the material will not break down, which extends the sealant protection for many years.

The insulation (R-Value) ability of the air barrier sealant according to the present invention comes from the fact that this polyurethane chemistry utilizes closed cell technology at the time of its manufacturing and is a raw ingredient of the finished formula. Advantageously, the closed cell polyurethane foam of the present invention is the most energy efficient system available and becomes so with increased density. This air barrier sealant uses the closed cells of the chemistry to provide the insulation factor of the material when it is applied and it is the ability of this sealant to "rise" that gives the additional insulation factor. It is the two component chemistry as sprayed through a proportioning type mixing system that allows for the finished sealant to be manufactured upon coming in contact with air. The finished sealant is the combination of the two components mixing in the air and then curing on the wall surface. In one embodiment, at least one of the components is put under a pressure of 1,500 psi. In another embodiment, at least one of the components is put under a temperature of 130 to 150 degrees Fahrenheit.

The fire proof protectant used with the sealant according to the present invention is selected from the group consisting of special technologies that prevent the sealant from flashing or burning, such as, for example, polybrominated diphenyl ethers (PBDEs). The air barrier will add an additional layer of protection to the building envelop because it will not be considered a source for flame spread in the event of a fire.

The fire proofing ingredient is added to the polyurethane chemistry at the time of its manufacturing and is a raw ingredient of the finished formula. It is designed to stay in suspension in the liquid until it is sprayed at the job site. The ingredient is of a design and formulation that it allows it to stay in suspension until sprayed, thus giving a uniform fireproof protection throughout the finished product.

The antimicrobial ingredient is added to the polyurethane chemistry at the time of its manufacturing and is a raw ingredient of the finished formula. It is designed to stay in suspension in the liquid until it is sprayed at the job site. The ingredient is of a design and formulation that it allows it to stay in suspension until sprayed, thus giving a uniform antimicrobial protection throughout the finished product The antimicrobial ingredient provides antifungal or antibacterial protection or a combination thereof. Preferably, the combination of at least one antimicrobial agent within the sealant material ensures that no living organism grows on or within the sealant product including but not limited to the prevention of mold, mildew, bacteria, fungi or other microorganisms. The barrier sealant provides protection to surfaces against external damage, agents or other forces including but not limited to microbes, mold, mildew, gas deterioration, moisture deterioration, insect damage and/or corrosion.

Various antimicrobial agents can be used. For example, quaternary ammonium compounds, such as Microban®, can be used. Additionally or alternatively, silver compounds can be used. More preferably, nano silver, or silver nanoparticles, are used.

In methods of using the air barrier sealant according to the present invention, method steps include providing a air barrier product including a polyurethane material and at least one UV, fire and antimicrobial protectant agent; applying the air barrier product onto an enclosure surface in a continuous manner to form a continuous barrier; wherein upon application to the surface the polyurethane material expands to produce an insulative thickness between the enclosure surface and the top exposed surface of the air barrier sealant; and wherein the top exposed surface of the air barrier product provides UV protection. The insulative thickness is preferably between about ⅛ inch to about 1 inch. In another preferred embodiment the insulative thickness is between about ⅛ inch to about ¾ inches. In yet another preferred embodiment, the insulative thickness is between about ⅛ inch and ½ inch. In another preferred embodiment, the insulative thickness is between about ⅛ inch and ¼ inch.

A dual component formulation, the combination of the at least one UV, fire and antimicrobial protectant agent with the polyurethane material, may be combined prior to application of the air barrier sealant to the enclosure surface, or at the time of application (through controlled mixing or combination with an application device that provides for spraying of the polyurethane material and the at least one UV, fire and antimicrobial protectant agent until the time of application).

Application of the air barrier sealant according to the present invention is preferably by spray application to the enclosure surface, and is a dual component mixing of the polyurethane material and the at least one UV, fire and antimicrobial protectant on site or location of the enclosure to be coated and protected by the air barrier sealant. In this manner, the final formulation of the air barrier sealant composition occurs during the mixing process just prior to or upon application (in the air during spray application) to the enclosure surface. At the time of application to the enclosure surface, the polyurethane material expands to provide a thickness between about ⅛ inch (3.175 mm) and about 1 inch (25.4 mm). The expansion of the polyurethane material provides for insulative thickness to provide energy efficient insulation when applied to building or room surfaces, including floors, walls, ceilings, etc. The expansion of the polyurethane material also fills in cracks and holes that are major sources of air intrusion. The final mixed and expanded state of the air barrier product provides a top exposed surface that is resistant to cracking, breaking, chipping, corrosion, or other deterioration, and provides a physical air barrier of protection to the coated enclosure. Also, this air barrier can act to reduce the impact upon the surface and increase its resistance to damage. Furthermore, the air barrier sealant adheres to the enclosure surface, so it resists delaminating or peeling as well. The air barrier sealant is applicable to any enclosure surface, including but not limited to enclosure surfaces selected from metal, glass, wood, plastic, concrete, cinder block, asphalt, glass board, polyurethane foams and other air barrier type material such as caulks and the like, and combinations thereof.

Thus, the present invention eliminates uncontrolled air leakage, improves occupant comfort, health and safety, improves indoor environmental quality, improves structural strength, reduces condensation, moisture and mold problems, conforms to any shape, and provides UV, fire and antimicrobial protection to exposed surfaces.

Referring now to testing results, in general, these test results are illustrations for the purpose of describing a preferred embodiment of the invention and are not intended to limit the invention thereto. In these test cases, laboratory application of the air barrier sealant according to the present invention was under ASTM standards applicable for ASTM E2178-03 Standard Test Method for Air Permeance of Building Materials, dated Aug. 21, 2009. This test was conducted at ¼" thickness and in accordance to the current ASTM standards for Air Permeance Properties for building components. The evaluation was for one (1) specimen which was sealed within an air leakage test chamber.

Testing background and experimental protocols included the following: Specimens were sealed within the air leakage chamber. Air was exhausted from the chamber at rates required to maintain test pressure differences of 25, 50, 75, 100, 150, 250 and 300 Pa. The air leakage through the specimens were measured at each successive pressure difference and monitored for any physical changes. The air leakage of the specimens was then re-measured at pressure differentials of 100, 75, and 50 Pa, as required by the test procedure. Test results are indicated in Table 1 for air permeance properties.

TABLE 1

Air Permeance Results in Accordance with ASTM E2178-03

| Differential Pressure Pa (lbs/ft$^2$) | Average Calculated Air Flow L/(s m$^2$) | Average Calculated Air Flow CFM/ft$^2$ | Thickness | Note |
|---|---|---|---|---|
| 25 (0.52) | 0.000329 | 0.00007 | 6.8 mm | SI units are the |
| 50 (1.05) | 0.000503 | 0.00010 | | primary units |
| 75 (1.57) | 0.000645 | 0.00013 | | of measure |
| 100 (2.09) | 0.000769 | 0.00015 | | |
| 150 (3.14) | 0.000986 | 0.00020 | | |
| 250 (5.23) | 0.001348 | 0.00027 | | |
| 300 (6.27) | 0.001508 | 0.00030 | | |
| 100 (2.09) | 0.000843 | 0.00017 | | |
| 75 (1.57) | 0.000671 | 0.00013 | | |
| 50 (1.05) | 0.000487 | 0.00010 | | |

Conclusions from the testing include that the air barrier sealant met or exceeded the standard for air permeance for polyurethane foams and sealants as outlined by ABAA which is the Air Barrier Association of America, Inc.

Also, FIG. 1 is a graph showing data associated with test results of an air barrier sealant product according to one embodiment of the present invention. Importantly, the regression curve fitted to the results has an $R^2$ value of 0.98689, indicating the non-deformable nature of the air barrier product with regard to changes in pressure.

Due to the success of this test and some other preliminary tests, the sealant of the present invention is indicated to be in conformance with the ABAA Spray Polyurethane Foam guidelines and to adhere to the test standards as established by the ABAA Process for Approval of Air Barrier Materials, Components and Assemblies JUNE 2007 Version 2.0 Draft (ABAA-10001-02). These test standards are shown in the following table, as applied to ¼" thickness.

| Product Property | Test Standard | Test Standard Title | Unit | Requirements | |
|---|---|---|---|---|---|
| | | | | Min | Max |
| Air Permeance | ASTM E 2178 | Standard Test Method for Air Permeance of Building Materials | L/(s · m$^2$) | — | 0.02— tested in both directions |
| Flame Spread Characteristics | ASTM E84-05 | Standard Test Method for Surface Burning Characteristics of Building Materials | — | — | 50 |
| Water Vapor Transmission | ASTM E-96-00e1 | Standard Test Methods for Water Vapor Transition of Materials—Water Method | ng/ (Pa · s · m$^2$) | Declaration of thickness at which material meets 1 perm | — |

-continued

| Product Property | Test Standard | Test Standard Title | Unit | Requirements Min | Requirements Max |
|---|---|---|---|---|---|
| Thermal Transmission | ASTM E-177-04 | Standard Test Method for Steady-State Heat Flux Measurements and Thermal Transmission Properties by Means of the Guarded-Hot-Plate Apparatus | $m^2 \cdot °C/W$ | 2.0 | — |
| Compressive Strength | ASTM D-1621-04a | Standard test method for Compressive Properties of Rigid Cellular Plastics | kPa | 170 | — |
| Density | ASTM D-1622-03 | Standard Test Method for Apparent Density of Rigid Cellular Plastics | $kg/m^3$ | 28 | — |
| Tensile Strength | ASTM D-1623-03 | Standard Test Method for tensile and Tensile Adhesive Properties of Rigid Cellular Plastics | kPa | 200 | — |
| Dimensional Stability | ASTM D-2126-04 | Standard Test Method for response of Rigid Cellular Plastics to Thermal and humid Aging −20° C. 80° C. 70° C., 97% ± 3% R.H. | % | — — — | −1 +8 +14 |
| Water Absorption | ASTM D-2842-01 | Standard test method for Water Absorption of Rigid Cellular Plastics | % | — | 4 |
| Open Cell Content | ASTM D-2856-94 | Standard test Method for Open-Cell Content of Rigid Cellular Plastics by the Air Pycnometer | % | — | 8 |
| Pull Adhesion | ASTM D-4541-02 | Standard Test Method for Pull-Off Strength of Coatings Using Portable Adhesion testers | kPa | 110 or report force at cohesion failure | — |

The test results shown above in tables 1 and 2 were performed on a ¼" barrier. Because thicker barriers would provide at least these properties, the present invention provides for sealants with a range of between about ¼" and about 1" with at least the same properties. Preferably, the barriers include a range of between about ¼" to about ³⁄₁₆" between about ¼" to about ⅜", between about ¼" to about ½", between about ¼" to about ⅔" between about ¼" to about ⅝", between about ¼" to about ¾", and between about ¼" to about ⅞".

Additionally, in one embodiment of the invention, the barrier has a strength of 367.80 psi. In another embodiment of the invention, the barrier has an adhesion of 367.80 psi. In yet another embodiment, the strength of the barrier is equal to the strength of the underlying substrate. For example, if the barrier is applied to concrete, the strength of the barrier is equal to the strength of the concrete.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. An air barrier sealant consisting of:
   a closed cell polyurethane material including UV, fire and antimicrobial protectants, the closed cell polyurethane material not having more than 8% open cells;
   wherein the air barrier sealant has a top exposed surface that is spaced apart from a bottom surface by thickness, wherein the top exposed surface is resistant to cracking, breaking, chipping, corrosion, and other deterioration;
   wherein both the top exposed surface and the corresponding bottom surface completely cover a surface of an object by the bottom surface adhering to the object surface;
   wherein the air barrier sealant expands after application to the entire wall, the thickness being between about ¼ inch and about 1 inch;
   thereby providing an air barrier on the entire exposed wall surface;
   wherein the air barrier sealant has an air permeance of not more than about 0.00030 CFM/ft² upon application of a differential pressure to the air barrier sealant of about 300 Pa;
   wherein the air barrier sealant has a pull adhesion of not less than about 110 kPa and a tensile strength of not less than about 200 kPa;
   wherein the air barrier sealant is substantially non-deformable for differential pressures up to approximately 300 Pa; and
   wherein the average calculated air flow is no more than 0.001508 L/(sm²) for differential pressures up to approximately 300 Pa.

2. The air barrier sealant of claim 1, wherein the UV protectant is selected from the group consisting of black colorants which provide UV protection throughout the sealant.

3. The air barrier sealant of claim 2, wherein the UV protectant is carbon black.

4. The air barrier sealant of claim 1, wherein the fire proof protectant is selected from the group consisting of technologies which will prevent the sealant from flashing or burning.

5. The air barrier sealant of claim 1, wherein the antimicrobial protectant is at least one quaternary ammonium compound.

6. The air barrier sealant of claim 1, wherein the antimicrobial protectant is silver.

7. The air barrier sealant of claim 6, wherein the silver is nanoparticulate silver.

8. The air barrier sealant of claim 1, wherein the top exposed surface provides a physical air barrier protecting the wall surface from damage or exposure to damage from contamination, deterioration, water infiltration, rust, stains, corrosion and insects.

9. The air barrier sealant of claim 1, wherein the thickness is between about ¼ inch and about ¾ inch.

10. The air barrier sealant of claim 1, wherein the thickness is between about ¼ inch and about ½ inch.

11. The air barrier sealant of claim 1, wherein the thickness is between about ¼ inch and about ⅜ inch.

12. A method for providing a protective air barrier sealant which is substantially non-deformable for pressures up to approximately 300 Pa including:
providing an air barrier product consisting of a closed cell polyurethane material, the closed cell polyurethane material not having more than 8% open cells;
applying the air barrier sealant onto an exposed wall;
wherein upon application to the wall surface of the air barrier product will expand to produce a thickness of between about ¼ inch and about 1 inch between the wall surface and the top exposed surface of the air barrier sealant, wherein the top exposed surface is resistant to cracking, breaking, chipping, corrosion, and other deterioration;
wherein both the top exposed surface and a corresponding bottom surface completely cover the wall surface by the bottom surface adhering to the wall surface to create an air barrier layer on the wall surface; and
wherein the air barrier sealant has a pull adhesion of not less than about 110 kPa.

13. The method of claim 12, wherein the UV protectant is combined with the polyurethane material prior to application of the air barrier sealant to the wall surface.

14. The method of claim 13, wherein the air barrier sealant and UV protectant are applicable in a single step.

15. The method of claim 12, wherein at least one colorant is combined with the polyurethane material for the UV protection.

16. The method of claim 15, wherein the colorant is black.

17. The method of claim 12, wherein the air barrier product further includes an antimicrobial agent.

18. The method of claim 12, wherein the air barrier sealant adheres to the wall surface and is applicable to the wall surface, including surfaces made from metal, glass, wood, plastic, concrete, cinder block, asphalt, glass board, other polyurethane foams.

19. The method of claim 12, wherein the air barrier has a thickness of between about ¼ inch and about ¾ inch.

20. The method of claim 12, wherein the air barrier has a thickness of between about ¼ inch and about ½ inch.

21. The method of claim 12, wherein the air barrier has a thickness of between about ¼ inch and about ⅜ inch.

* * * * *